(12) United States Patent
Hu et al.

(10) Patent No.: US 10,349,434 B2
(45) Date of Patent: Jul. 9, 2019

(54) NETWORK INITIATED DOWNLINK DATA TRANSMISSION FOR STATIC AND NOMADIC DEVICES

(71) Applicant: Apple Inc., Cupertino, CA (US)

(72) Inventors: Haijing Hu, Beijing (CN); Dawei Zhang, Saratoga, CA (US); Huarui Liang, Beijing (CN)

(73) Assignee: Apple Inc., Cupertino, CA (US)

( * ) Notice: Subject to any disclaimer, the term of this patent is extended or adjusted under 35 U.S.C. 154(b) by 220 days.

(21) Appl. No.: 15/027,539

(22) PCT Filed: Feb. 15, 2016

(86) PCT No.: PCT/CN2016/073774
§ 371 (c)(1),
(2) Date: Apr. 6, 2016

(87) PCT Pub. No.: WO2017/139910
PCT Pub. Date: Aug. 24, 2017

(65) Prior Publication Data
US 2018/0054831 A1    Feb. 22, 2018

(51) Int. Cl.
*H04W 72/12* (2009.01)
*H04W 76/15* (2018.01)
(Continued)

(52) U.S. Cl.
CPC ..... *H04W 72/1273* (2013.01); *H04W 72/042* (2013.01); *H04W 72/1289* (2013.01);
(Continued)

(58) Field of Classification Search
CPC .......... H04W 72/1273; H04W 72/042; H04W 72/1289; H04W 76/025; H04W 48/04;
(Continued)

(56) References Cited

U.S. PATENT DOCUMENTS

2012/0002545 A1* 1/2012 Watfa ................ H04W 4/90
370/235
2012/0276913 A1   11/2012 Lim et al.
(Continued)

FOREIGN PATENT DOCUMENTS

CN    101369912    2/2009
CN    102006580    4/2011
(Continued)

OTHER PUBLICATIONS

International Search Report and Written Opinion for International Application No. PCT/CN2016/073774, dated Nov. 18, 2016, pp. 1-11.

*Primary Examiner* — Hardikkumar D Patel
(74) *Attorney, Agent, or Firm* — Meyertons Hood Kivlin Kowert and Goetzel PC; Jeffrey C. Hood

(57) ABSTRACT

This disclosure relates to techniques for performing network initiated downlink data transmissions with a wireless device in a cellular network. According to some embodiments, a wireless device and a cellular network may perform an attach procedure. As part of the attach procedure, the wireless device may indicate to the cellular network to store context information associated with the wireless device after the attach procedure is completed and the wireless device transitions to idle mode. The wireless device may also store context information. The stored context information may be used in conjunction with a network initiated downlink data transaction between the cellular network and the wireless device.

20 Claims, 8 Drawing Sheets

(51) Int. Cl.
*H04W 72/04* (2009.01)
*H04W 76/19* (2018.01)
*H04W 48/04* (2009.01)
*H04W 48/20* (2009.01)
*H04W 68/00* (2009.01)
*H04W 76/27* (2018.01)

(52) U.S. Cl.
CPC ............ *H04W 76/15* (2018.02); *H04W 76/19* (2018.02); *H04W 48/04* (2013.01); *H04W 48/20* (2013.01); *H04W 68/00* (2013.01); *H04W 76/27* (2018.02)

(58) Field of Classification Search
CPC ..... H04W 76/19; H04W 76/15; H04W 76/27; H04W 48/20; H04W 68/00; H04W 36/14; H04W 8/08; H04W 76/02; H04W 8/005; H04W 76/023; H04W 36/0022; H04W 36/24; H04W 4/22; H04W 28/0289; H04W 72/12; H04W 72/04; H04W 76/12; H04W 4/70; H04W 76/11; H04W 45/306; H04W 40/02; H04W 28/02; H04W 48/16; H04W 76/04; H04W 76/25; H04W 28/0215; H04W 28/18; H04W 64/006; H04W 76/18; H04W 74/08; H04W 52/02; H04W 68/02; H04W 52/0216; H04W 74/0833; H04L 45/306; H04L 12/721; H04L 12/813; H04L 45/38

See application file for complete search history.

(56) References Cited

U.S. PATENT DOCUMENTS

| | | | |
|---|---|---|---|
| 2012/0287858 A1* | 11/2012 | Klein | H04W 4/00 370/328 |
| 2013/0301559 A1 | 11/2013 | Zakrzewski | |
| 2014/0219248 A1* | 8/2014 | Reddiboyana | H04W 76/025 370/331 |
| 2015/0223284 A1 | 8/2015 | Jain et al. | |
| 2015/0230166 A1 | 8/2015 | Casati et al. | |
| 2015/0282082 A1 | 10/2015 | Landais et al. | |
| 2016/0127239 A1 | 5/2016 | Kahn et al. | |
| 2017/0034853 A1* | 2/2017 | Rune | H04W 68/02 |

FOREIGN PATENT DOCUMENTS

| | | | | |
|---|---|---|---|---|
| CN | 103687055 | | 3/2014 | |
| EP | 2825069 A1 | * | 1/2015 | ............. A42B 3/223 |
| EP | 2825069 A1 | * | 1/2015 | ............. A42B 3/223 |
| EP | 2925069 | | 9/2015 | |
| EP | 2925069 A1 | * | 9/2015 | ........... H04W 76/021 |
| EP | 2925069 A1 | * | 9/2015 | ............. H04W 76/25 |

* cited by examiner

NETWORK INITIATED DOWNLINK DATA TRANSMISSION FOR STATIC AND NOMADIC DEVICES

FIELD

The present application relates to apparatuses, systems, and methods for cellular networks and wireless devices to perform network initiated downlink data transmissions.

DESCRIPTION OF THE RELATED ART

Wireless communication systems are rapidly growing in usage. Further, wireless communication technology has evolved from voice-only communications to also include the transmission of data, such as Internet and multimedia content. Some examples of wireless communication standards include GSM, UMTS (associated with, for example, WCDMA or TD-SCDMA air interfaces), LTE, LTE Advanced (LTE-A), HSPA, 3GPP2 CDMA2000(e.g., 1xRTT, 1xEV-DO, HRPD, eHRPD), IEEE 802.11 (WLAN or Wi-Fi), IEEE 802.16 (WiMAX), Bluetooth, and others.

As the number of wireless devices increases, the amount of control signaling performed in wireless communication systems may also potentially increase. This may in turn represent an increasing burden on both radio resources and network node processsing load. Accordingly, improvements in the field would be desirable.

SUMMARY

Embodiments are presented herein of apparatuses, systems, and methods for performing network initiated downlink data transmissions for static and nomadic devices in a manner that limits control signaling overhead and network node processing load.

According to the techniques described herein, a wireless device may indicate to a base station when performing an attach procedure to store context information for the wireless device after the wireless device transitions to idle mode. The indication may be implicit as part of an indication that the wireless device is a static or nomadic wireless device, as one possibility. The wireless device, the base station, and possibly one or more additional network nodes may accordingly store context information for the wireless device after the attach procedure is complete and the wireless device is released to idle mode.

Subsequently, when the network has downlink data to provide to the wireless device, the wireless device, the base station, and the network nodes may be able to re-use the stored context information. This may allow for a simplified network initiated downlink data transaction between the wireless device and the network; for example, certain signaling messages and possibly security procedures may be avoided since the stored context information may be available. This may in turn reduce the amount of signaling overhead and the processing load on the network side, in particular as the number of downlink data transitions starting from idle mode between a wireless device and a given base station increases.

Such techniques may be useful for stationary wireless devices and/or devices that perform machine type communication, for example if such devices perform frequent small data transmissions and often or always communicate with the same network infrastructure equipment. Such techniques may also or alternatively be useful more generally (e.g., for mobile wireless devices and/or devices with diverse data communication patterns), according to various embodiments.

The techniques described herein may be implemented in and/or used with a number of different types of devices, including but not limited to cellular phones, tablet computers, wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
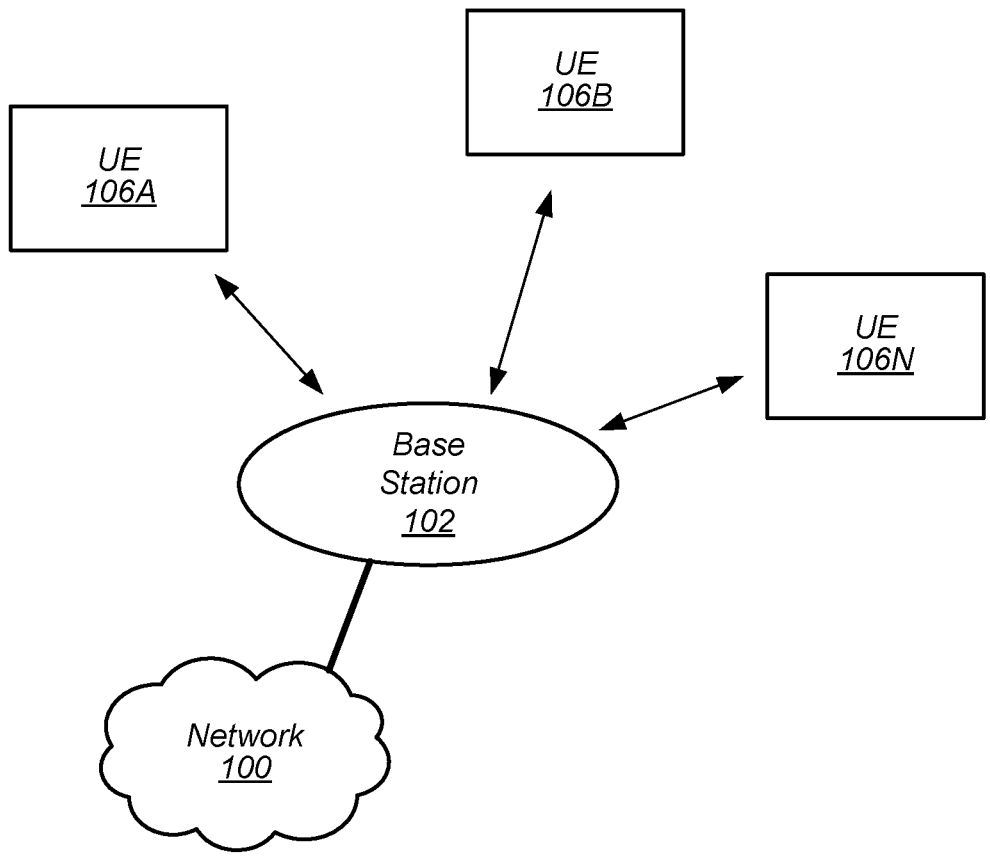
FIG. 1 illustrates an exemplary (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure:

UE: User Equipment
BS: Base Station
RAT: Radio Access Technology
3GPP: Third Generation Partnership Project
3GPP2: Third Generation Partnership Project 2
GSM: Global System for Mobile Communication
UMTS: Universal Mobile Telecommunication System
LTE: Long Term Evolution
RRC: Radio Resource Control
MME: Mobility Management Entity
S-GW: Serving Gateway
P-GW: Packet Data Network (PDN) Gateway Terms The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Cell—The term "cell" as used herein may refer to an area in which wireless communication services are provided on a radio frequency by a cell site or base station. A cell may be identified in various instances by the frequency on which the cell is deployed, by a network (e.g., PLMN) to which the cell belongs, and/or a cell identifier (cell id), among various possibilities.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
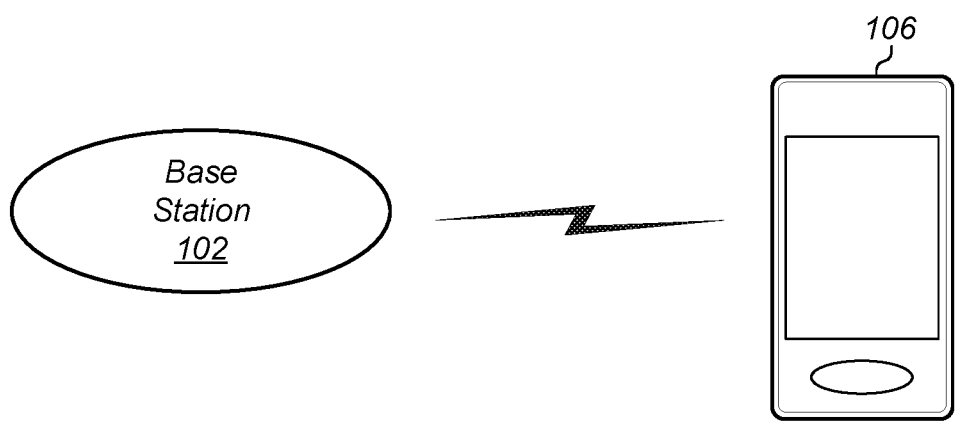
FIG. 2 illustrates an exemplary base station (BS) in communication with an exemplary wireless user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments of the disclosure may be implemented in any of various systems, as desired.

As shown, the exemplary wireless communication system includes a base station 102 which communicates over a transmission medium with one or more (e.g., an arbitrary number of) user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100.

The communication area (or coverage area) of the base station may be referred to as a "cell." The base station 102 and the UEs 106 may be configured to communicate over the transmission medium using any of various radio access technologies (RATs), wireless communication technologies, or telecommunication standards, such as GSM, UMTS (WCDMA, TD-SCDMA), LTE, LTE-Advanced (LTE-A), 3GPP2 CDMA2000 (e.g., 1xRTT, 1xEV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple RATs. For example, the UE 106 may be configured to communicate using two or more of GSM, UMTS, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

Figure 3:
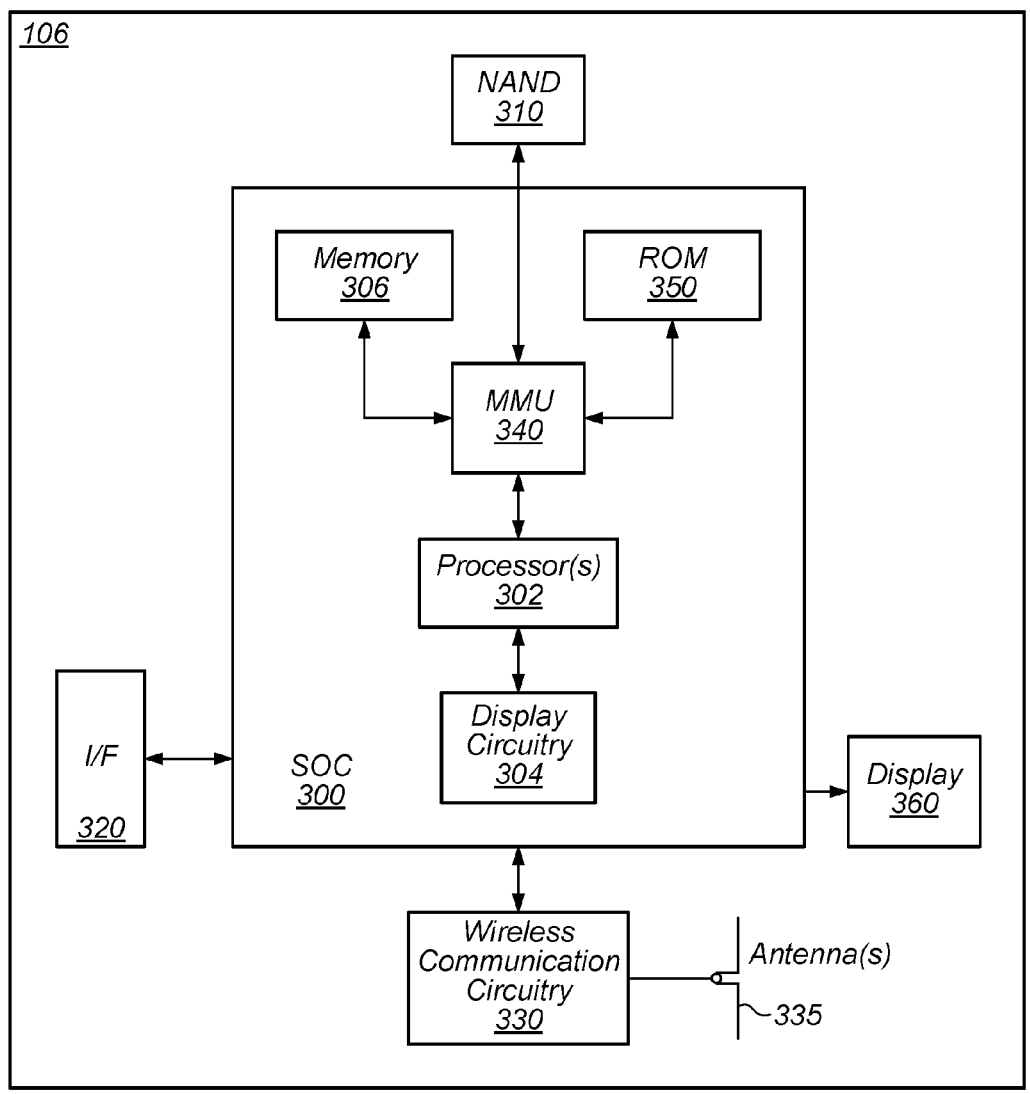
FIG. 3 illustrates an exemplary block diagram of a UE device, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

As noted above, the UE 106 may be configured to communicate wirelessly using multiple wireless communication technologies. As further noted above, in such instances, the wireless communication circuitry 330 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 335 to perform the wireless communication.

As described further subsequently herein, the UE 106 may include hardware and/or software components for implementing features for performing network initiated downlink data transmissions, such as those described herein with reference to, inter alia, FIG. 6. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Figure 4:
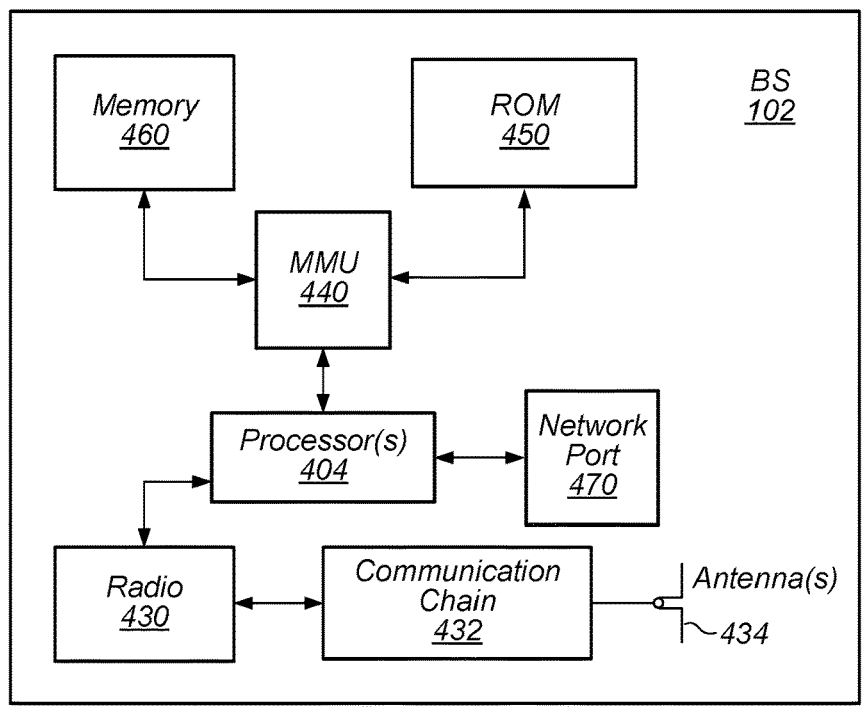
FIG. 4 illustrates an exemplary block diagram of a BS, according to some embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
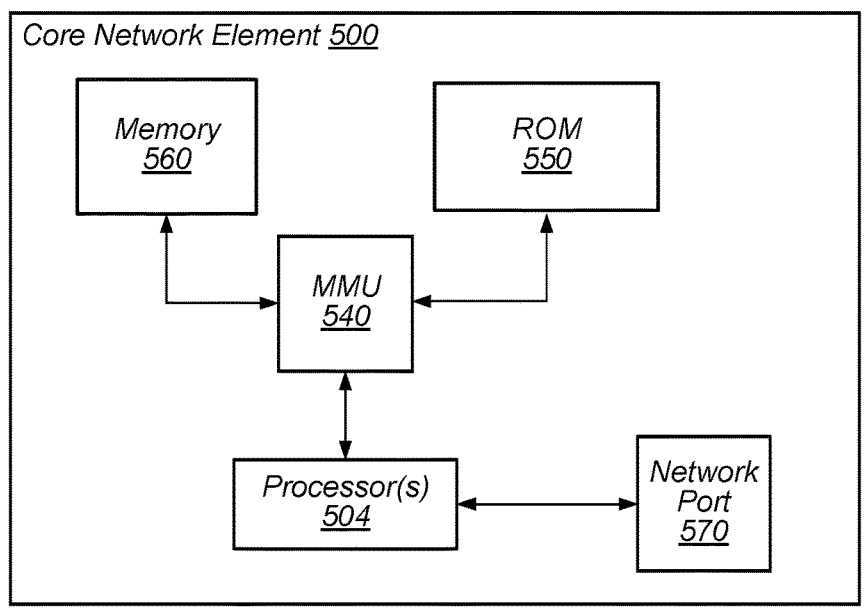
FIG. 5 illustrates an exemplary block diagram of a core network element, according to some embodiments.

FIG. 5—Exemplary Block Diagram of a Core Network Element

FIG. 5 illustrates an exemplary block diagram of a core network element 500, according to some embodiments. The core network element 500 may impelement one or more logical functions/entities of a cellular core network, such as a mobility management entity (MME), serving gateway (S-GW), etc. It is noted that the core network element 500 of FIG. 5 is merely one example of a possible core network element 500. As shown, the core network element 500 may include processor(s) 504 which may execute program instructions for the core network element 500. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The core network element 500 may include at least one network port 570. The network port 570 may be configured to couple to one or more base stations and/or other cellular core network entities and/or devices. The core network element 500 may communicate with base stations (e.g., eNBs) and/or other core network entities/devices by means of any of various communication protocols and/or interfaces. As one example, in a 3GPP context, the core network element 500 may use any or all of a S1, S2, S3, S4, S5, S6, S7, and/or any of various other communication protocols or interfaces to communicate with other cellular network components.

The processor(s) 504 of the core network element 500 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
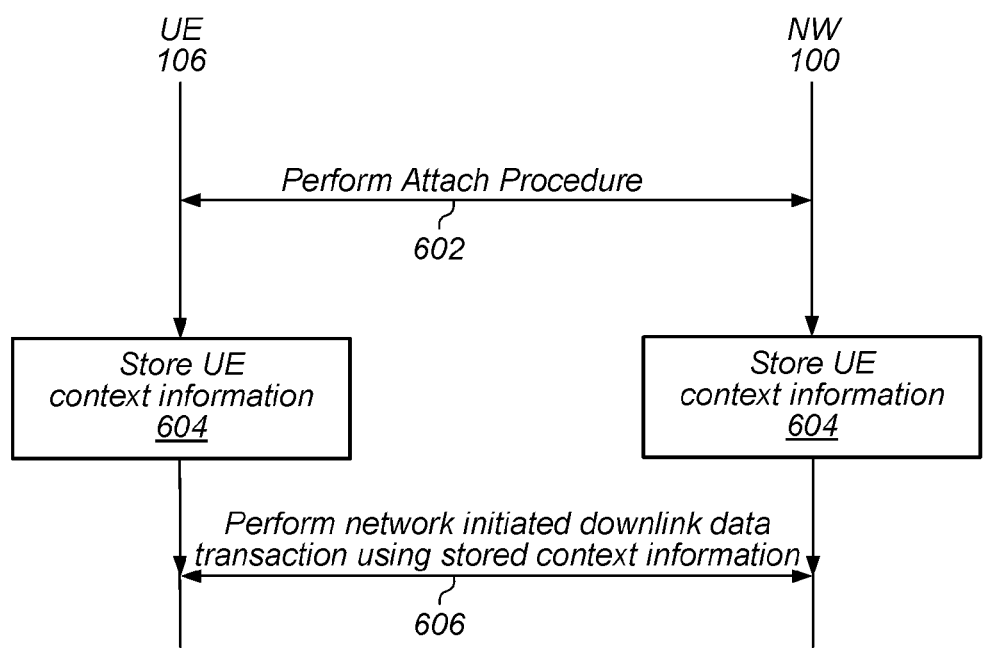
FIG. 6 is a signal flow diagram illustrating an exemplary method for a UE device and a cellular network to perform a network initiated downlink data transaction with reduced control signaling overhead, according to some embodiments.

FIG. 6—Signal Flow Diagram

As cellular communication technologies evolve, an increasing number of cellular communication capable devices are expected to be deployed. This may in turn require a potentially significant increase in support for connected devices per unit area.

Further, one of the reasons for the continuing increase in the numbers of devices includes the development and spread of devices performing machine type communication (MTC). Such devices, which may include stationary deployed devices, wearable devices, and/or other devices forming part of the "Internet of Things" may commonly be designed to perform frequent and/or periodic small data transmissions. A substantial number of these (and other) devices capable of performing cellular communication may be classified as "stationary" (e.g., indicating that the device may be deployed in a stationary location) or "nomadic" (e.g., indicating that the device may be moved between locations, but may generally be stationary once deployed in a location) with respect to mobility.

One potential impact of increasing numbers of connected devices, including of MTC devices, may include an increased amount of control signaling, both over radio access network and core network interfaces. For example, if a full network triggered service request procedure is performed on each occasion of a downlink transmission to a MTC device in idle mode, this may represent substantial amount of signaling, and may also increase processing load in the network nodes.

FIG. 6 is a signal flow diagram illustrating a method for a wireless device 106 (e.g., a wireless user equipment (UE) device such as illustrated and described with respect to FIGS. 1-3) and a cellular network 100 (potentially including a base station such as illustrated and described with respect to FIGS. 1-2 and 4 and one or more core network elements such as illustrated and described with respect to FIG. 5) to perform a network initiated downlink data transmission with reduced signaling overhead. According to the method of FIG. 6, it may be possible to take advantage of scenarios when context information for a UE device is likely to be reusable (such as when a device is static or nomadic) by storing the context information for the UE device generated when the UE device initially attaches to the network even after the UE device transitions to idle mode, and subsequently reusing the stored UE context information when possible.

The method shown in FIG. 6 may be used in conjunction with any of the computer systems or devices shown in the above Figures, among other devices. In various embodiments, some of the method elements shown may be performed concurrently, in a different order than shown, substituted for by other method elements, or may be omitted. Additional method elements may also be performed as desired. As shown, this method may operate as follows.

In 602, a UE device 106 and a cellular network 100 may perform an attach procedure. The attach procedure may allow the UE 106 to register with the cellular network 100, e.g., in order to obtain services from the cellular network that require registration. As part of the attach procedure, a variety of messages/signaling may be provided between the UE 106 and the cellular network 100 elements.

In some embodiments, the attach procedure may be initiated by the UE 106 sending an attach request to its serving base station, which may propagate the attach request to a MME of the cellular network (e.g., a MME associated with a tracking area in which the UE 106 is located). The cellular network may authenticate the UE 106, e.g., to confirm that the UE 106 has permission to register with the cellular network 100. If accepted, a session for the UE 106 may be created, potentially including setting up a data bearer (e.g., a default bearer) and context for the UE 106.

At least in some instances, as part of performing the attach procedure, the UE device 106 may provide an indication to the network 100 to store UE context information for the UE device 106 after the UE transitions to an idle mode. Such an indication may be provided in any of various ways, such as by setting a field included as part of the initial attach request message to indicate to store UE context information after the UE transitions to idle mode. Note that the indication to store context information for the UE device 106 may be explicit or implicit. For example, the indication to store context information for the UE 106 may be implied as part of an indication that the UE device 106 intends to perform a specific type of communication and/or is a specific type of UE device 106, among various possibilities. As one such possibility, if the UE 106 is classified in a certain manner (such as being classified as static or nomadic with respect to mobility), an indicator value and/or cause code included in the attach request may indicate this to the network 100, and the UE device 106 and the network 100 may each be configured (e.g., based on standard requirements, infrastructure design, and/or network operator policy) to store context information for the UE device 106 while the UE device 106 is in idle mode based on such an indication of a characteristic or type of the device that is performing the attach procedure.

In many instances, a UE may attach to a network with the intention to perform data exchange. In such an instance, the UE 106 may also exchange data (e.g., transmit uplink data and/or receive downlink data) with the cellular network 100 using the established data bearer. The data may include application data associated with an application executing on the UE 106, as one possibility. In some embodiments, the application may be a sensing or measuring application, which occasionally (e.g., periodically) or continuously performs one or more sensing or measuring operations, and communicates data obtained from the sensing or measuring operation(s) by way of a network connection provided by the network 100. In other embodiments, the application may be any of various other (e.g., web browser, game, email, messaging, productivity, etc.) types of applications, and/or the data communicated with the network 100 may include other types of data.

Once the attach procedure and any data exchange is complete, the UE 106 may transition to an idle mode. This may include the UE 106 and its serving base station releasing a radio resource control (RRC) connection that was established as part of the attach procedure. The cellular network 100 may also release the data bearer for the UE 106 and release a connection with the base station. The UE 106 may remain attached to the cellular network 100 in the idle mode, though the UE 106 and the cellular network 100 may not exchange data (e.g., until a new RRC connection is established).

In 604, both the UE 106 and the network 100 (e.g., including one or more of a base station, mobility management entity, and/or serving gateway serving the UE 106) may store context information for the UE 106 after the transition to idle mode. Note that in some instances, certain core network entities (e.g., the MME and S-GW) may be co-located and may jointly store context information for the UE 106.

The stored context information may include information that may facilitate more rapid subsequent network initiated downlink transmissions. The context information stored may differ for some or all of the UE device 106 and the entities of the network 100, at least in some embodiments. For example, the UE device 106 may store Uu context information, security information, and/or data radio bearer information, among various possible access stratum context information applicable to the UE device 106. The base station serving the UE device 106 may also store Uu context information, security information, and/or data radio bearer information for the UE device 106, and may also store S1 context information and/or S1 bearer information, among various possible context information. As another example, the MME and/or S-GW associated with the UE device 106 may store S1-MME and/or S1-U context information for the UE device 106. As a still further example, the packet gateway (P-GW) associated with the UE device 106 may store S5 context information for the UE device 106.

In 606, the UE 106 and the network 100 may perform a network intiated downlink data transaction. Since the UE 106 and the network 100 may have retained the context information for the UE 106, it may be possible to perform a simplified procedure to accomplish the network initiated downlink data transaction.

For example, by using stored context information, it may (at least in some instances) be possible to forego some or all aspects of the service request procedure, potentially including the UE 106 sending a service request NAS message, NAS authentication/security procedures for the UE 106, creation of new UE context information, and/or avoid other aspects of a service request procedure.

In some embodiments, the network intiated downlink data transaction may be triggered when one or more downlink data packets for the UE 106 are received by a P-GW of the cellular network 100. The P-GW may provide the first downlink data packet (or a special packet) to the serving base station by way of the S-GW/MME. The serving base station may page the UE 106, and may perform RRC connection and radio bearer setup and base station-core network connection setup. If needed (e.g., depending on the nature of the data to be exchanged, network policy, etc.), a dedicated bearer may be setup, or a default bearer may be used, and the downlink data may be transmitted to the UE 106. If the UE 106 also has uplink data to transmit, the UE 106 may also transmit the uplink data using the established data bearer(s).

Note that at least in some embodiments, if the simplified network initiated service request procedure using the context information for the UE 106 is unsuccessful, the network 100 and the UE 106 may perform a full network initiated service request procedure, e.g., with additional control signaling and security procedures. Additionally, as previously noted, in some instances certain core network functions (e.g., MME and S-GW) may be co-located and possibly combined in conjunction with the method of FIG. 6, potentially simplifying network architecture, transaction flow, and signaling load. Thus, at least in some instances, the techniques described herein may reduce the control signaling and/or network node processing loads associated with network initiated downlink data transmissions.

While storing context information for the UE 106 may allow simplification of network architecture and transaction flow and reduce signaling and processing load, it should be noted such a feature may also result in an increased data storage burden, in particular at network nodes that may store context information for multiple UE devices. However, at least in some instances, this may represent a relatively minimal cost; for example, in many deployments (e.g., including those that make substantial use of software defined network functions), data storage may not be a highly limited resource.

As noted above, storing context information may be particularly useful, at least in some embodiments, for wireless devices that are deployed in stationary (e.g., static) implementations or implementations with limited mobility (e.g., nomadic), such that the wireless device may mostly or always communicate with a network by way of the same network infrastructure equipment (e.g., serving base station, MME, SGW, etc.). As also noted above, in some deployments the storage cost of retaining the context information may be relatively minimal. Accordingly, in some instances, it may be preferable that stored context information be stored indefinitely, e.g., to allow for simplified network initiated downlink data transmission procedures each time the network has data to provide to the UE device 106 while the UE device is in idle mode.

Alternatively, it may be preferable in some instances for stored context information for the UE 106 to eventually expire and be discarded, for example in case a wireless device is removed from a stationary deployment and/or moved to a new location. This may also be more desirable if the storage cost in a particular network deployment of retaining context information represents more of a burden.

As one possibility for facilitating removal of stale context information, in some embodiments the UE 106 and/or one or more nodes (e.g., base station, MME, SGW) of the network 100 may utilize one or more timers associated with stored context information. For example, when the network 100 and the UE device 106 store UE context information after completion of an attach procedure, one or more of the nodes could initiate a timer associated with the UE context information. If a new RRC connection between the UE device 106 and the network 100 is established before expiration of the timer, the timer may be re-set when the new RRC connection is released. If the timer expires, one or more of the nodes may discard its stored UE context information. In this case, previously stored UE context information may not be available for the next network initiated downlink data transmission. This may help prevent unnecessary storage of stale UE context information by wireless devices and/or network nodes, which may improve overall resource usage efficiency.

Note that in some embodiments, a similar procedure as illustrated in and described with respect to FIG. 6 may be used in conjunction with tracking area updates. For example, the UE device 106 could perform a tracking area update with the cellular network 100 upon moving to a new tracking area, triggering generation of new UE context information, which might in turn be stored after transition to idle mode by the UE device 100 and used subsequently for network initiated downlink transactions in the new tracking area. However, at least in some instances, this may be uncommon for static/nomadic devices, given the typical mobility characteristics of such devices.

FIGS. 7-10—Example Cellular Network Architectures and Network Initiated Downlink Data Transaction Signal Flows As previously described with respect to FIG. 6, possible techniques for reducing such control signaling and processing load associated with network initiated downlink data transactions may include storing context information for a UE device (e.g., both by the UE device and by network nodes) while the UE device is in idle mode to simplify subsequent network initiated downlink data transactions with the same network nodes. FIGS. 7-10 illustrate possible examples of network architecture and signal flows that can be used in conjunction with network initiated downlink data transactions. Note that FIGS. 7-10 and the information provided herein below in conjunction therewith are provided by way of example of various considerations and details relating to possible systems (such as 3GPP based systems) with which the method of FIG. 6 may be implemented according to some embodiments, and are not intended to be limiting to the disclosure as a whole. Numerous variations and alternatives to the details provided herein below are possible and should be considered within the scope of the disclosure.

Figure 7:
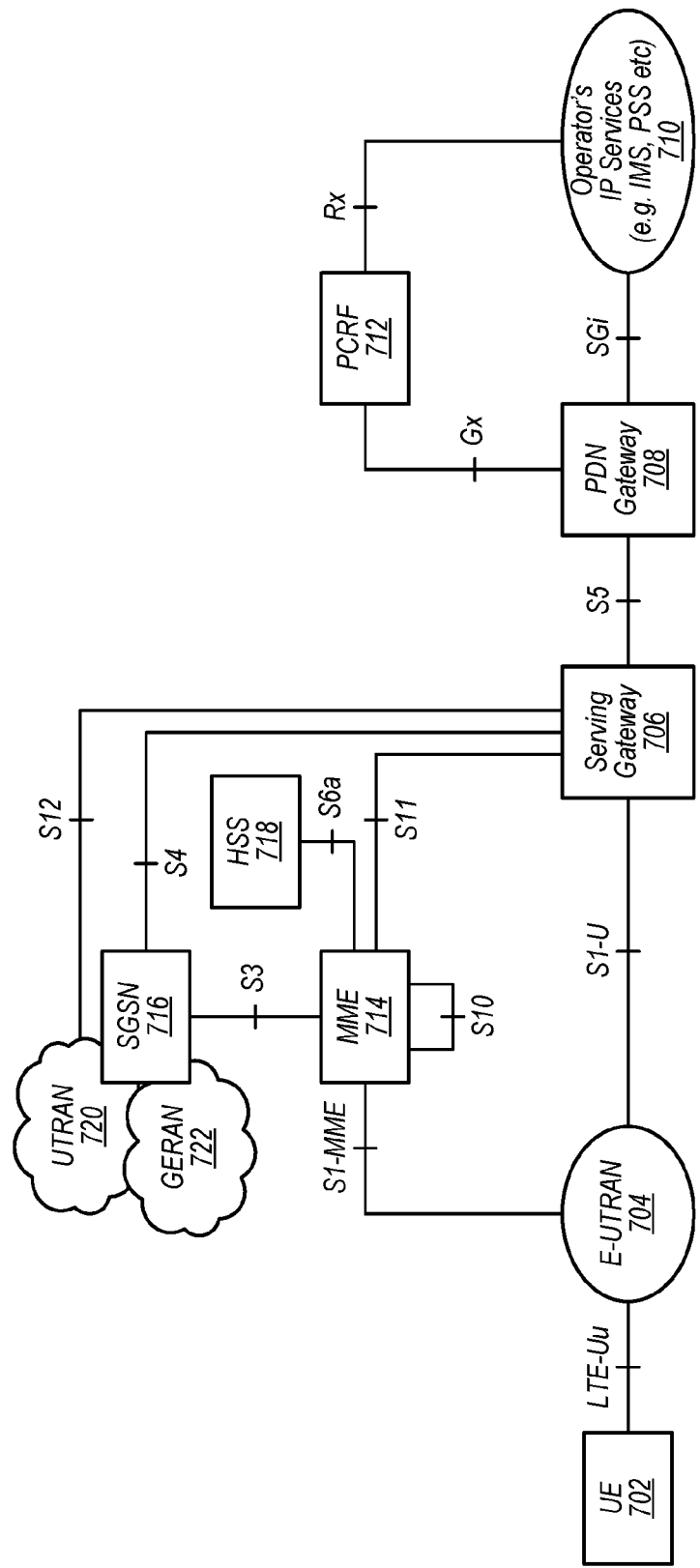
FIG. 7 is a network architecture diagram illustrating aspects of a possible cellular network architecture, according to some embodiments.

FIG. 7 illustrates aspects of one possible cellular network architecture. According to the architecture illustrated in FIG. 7, a UE device 702 may be coupled to an evolved universal terrestrial radio access network (E-UTRAN) 704 by way of a LTE-Uu interface. The E-UTRAN 704 may be coupled to a S-GW 706 by way of an S1-U interface, which may in turn be coupled to a packet data network (PDN) gateway 708 by way of an S5 interface, an UTRAN 720 by way of an S12 interface, and a serving GSM support node (SGSN) 716 by way of an S4 interface. The PDN gateway 708 may be coupled to the network operator's IP services (e.g., IMS, PSS, etc.) 710 by way of an SGi interface and to a policy charging and rules function (PCRF) 712 by way of a Gx interface. The IP services 710 and PCRF 712 may themselves be coupled by an Rx interface.

The E-UTRAN and S-GW may also be coupled to an MME 714 by way of S1-MME and S11 interfaces respectively. MMES 714 may communicate with each other by way of an S10 interface. The MME 714 may also be coupled to a home subscriber server (HSS) 718 by way of an S6a intervace and to the SGSN 716 by way of an S3 interface. The SGSN 716 may also be coupled to the UTRAN 720 and to a GSM EDGE radio access network (GERAN) 722.

Figure 8:
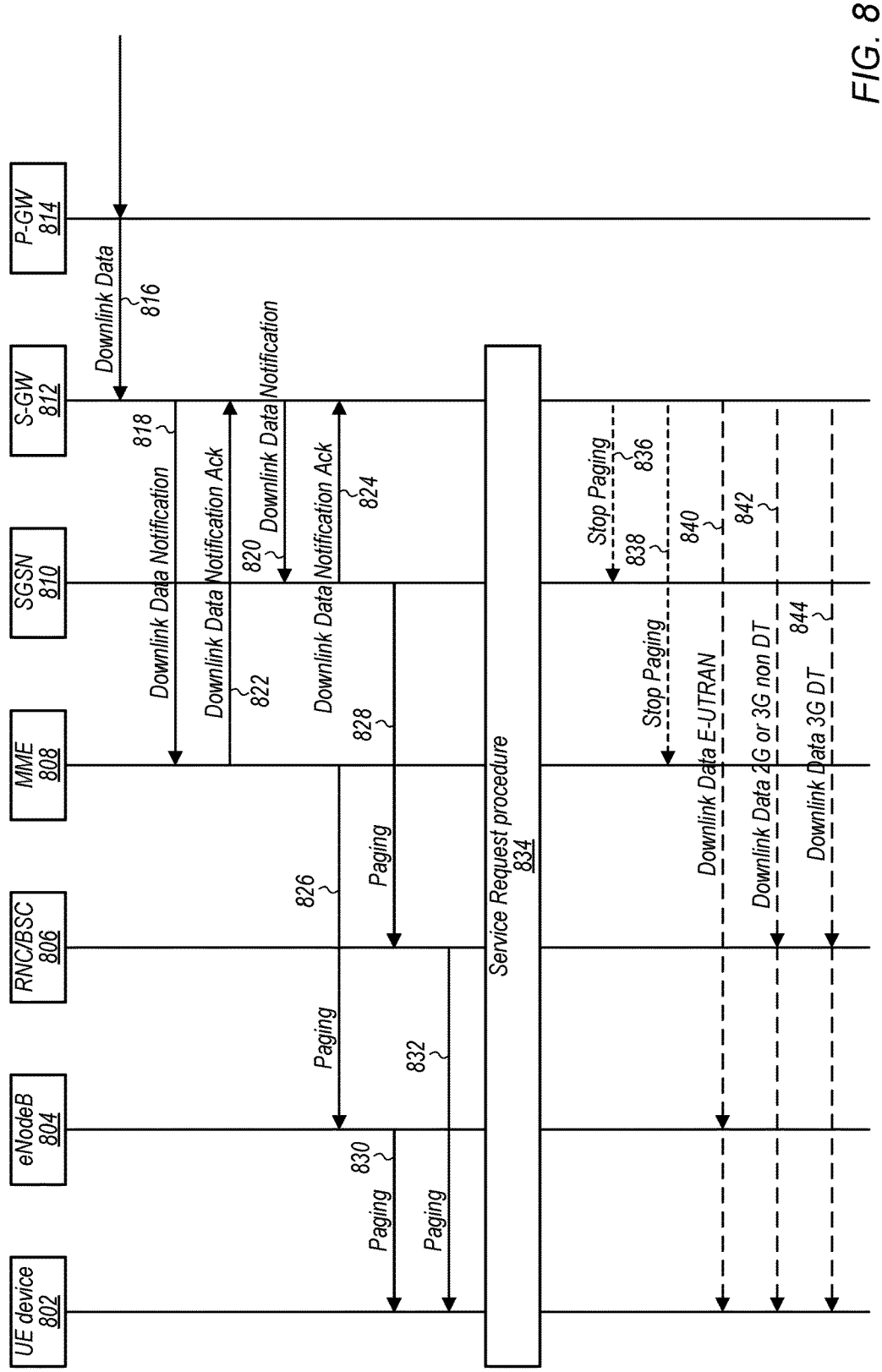
FIG. 8 is a signal flow diagram illustrating aspects of a possible network initiated service request procedure, according to some embodiments.

FIG. 8 illustrates a possible "full" network initiated service request procedure, e.g., such as might be used if to perform a network initiated downlink data transaction if UE context information is not available or if an attempt to perform a network initiated downlink data transaction using UE context information is not successful. According to the network initiated service request procedure of FIG. 8, a PDN gateway (P-GW) 814 may receive downlink data for a UE device 802 and may provide the downlink data to a S-GW 812 (816). The S-GW 812 may provide a downlink data notification to a MME 808 (818) and may also provide a downlink data notification to a SGSN 810 (820) for which the S-GW 812 has control plane connectivity for the UE device 802. The MME 808 may respond with a downlink data notification acknowledgement (822), and the SGSN 810 may similarly respond with a downlink data notification acknowledgement (824). If the UE 802 is registered with the MME 808, the MME 808 may page the eNodeB 804 associated with the UE 802 (826). Similarly, if the UE 802 is registered with the SGSN 810, the SGSN 810 may page the RNC/BSC 806 associated with the UE 802 (828). The eNodeB 804 may page the UE device 802 (830) and/or the RNC/BSC 806 may page the UE 802 (832).

Upon receiving a paging message, the UE 802 may initiate and perform a UE triggered service request procedure (834). As one possibility, if the eNodeB 804 is successful at pagint the UE 802, the service request procedure 834 may include any or all of transmission of a NAS service request from the UE 802 to the eNodeB 804 and from the eNodeB 804 to the MME 808, authentication and security procedures between the UE 802, MME 808, and a home subscriber server (HSS) (not shown), S1-AP Initial context setup request transmission from the MME 808 to the eNodeB 804, radio bearer establishment between the UE 802 and the eNodeB 804, S1-AP initial context setup complete transmission from the eNodeB 804 to the MME 808, and/or any of various other signaling exchanges.

Upon completion of the service request procedure 834, the S-GW may inform the SGSN 810 that it may stop paging for the UE 802 (836) or may inform the MME 808 that it may stop paging for the UE 802 (838), e.g., depending on whether the UE 802 responded to paging using UTRAN or GERAN access or E-UTRAN access respectively. The downlink data may then be provided to the UE device 802 by way of E-UTRAN access (840), 2G or 3G non DT access (842), or 3G DT access (844).

Figure 9:
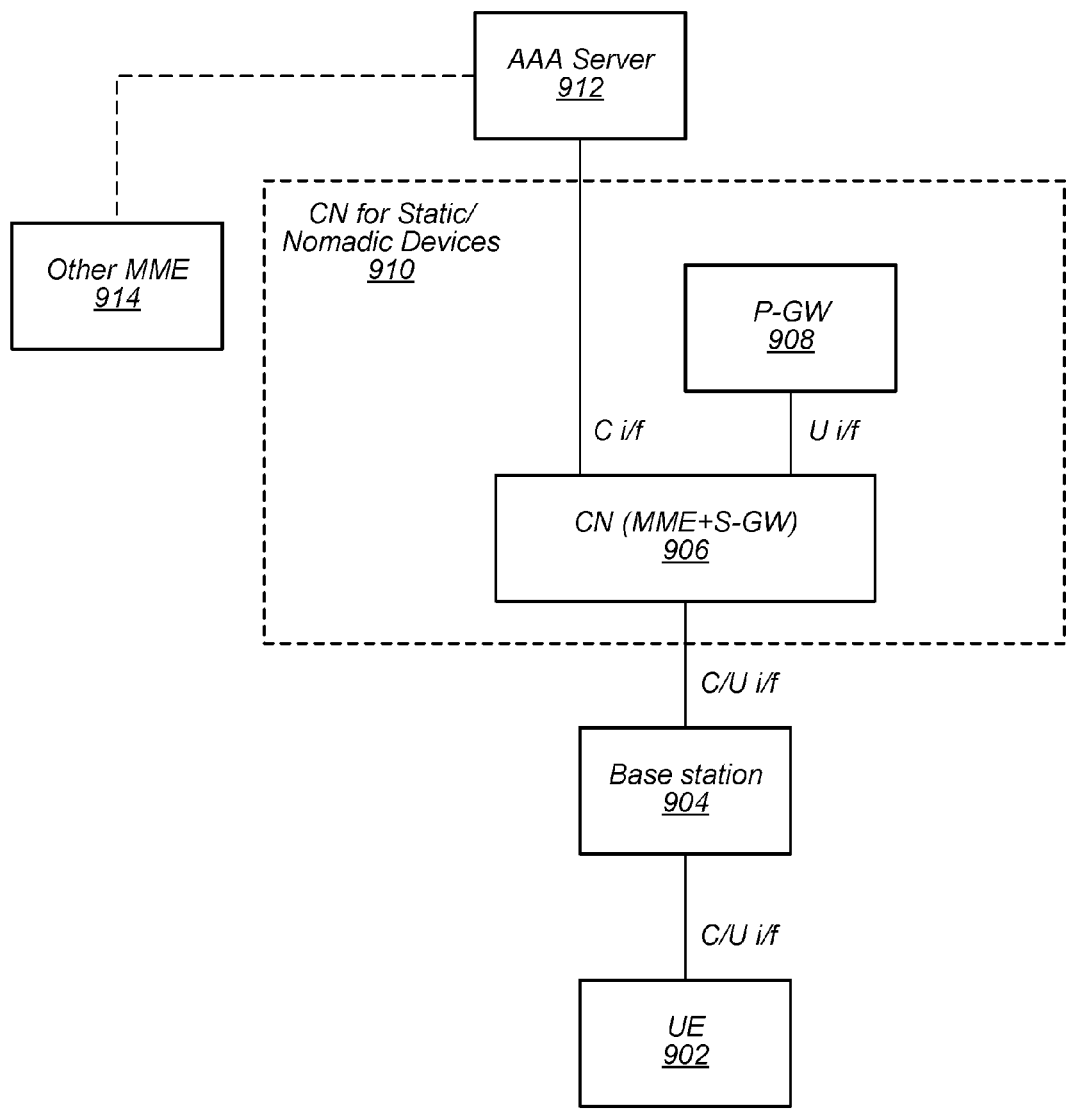
FIG. 9 is a network architecture diagram illustrating aspects of another possible cellular network architecture, according to some embodiments.

FIG. 9 illustrates aspects of another possible cellular network architecture. The cellular network architecture of FIG. 9 may be representative of a portion of a cellular network architcture capable of providing core network functions in different manners for each of various possible scenarios (e.g., each potentially having different QoS requirements, mobility characteristics, etc.). The portion illustrated in FIG. 9 may be illustrative of core network architecture components provided for static and nomadic devices, such as might be commonly deployed in a massive machine type communication (mMTC) scenario.

According to the architecture illustrated in FIG. 9, a (e.g., static/nomadic) UE device 902 may be coupled by control and user plane interfaces to a base station 904 (which may be an all-in-one base station or a separate baseband unit (BBU)+remote radio head (RRH) base station deployment, among various possibilities), which may in turn be coupled by control and user plane interfaces to a core network (CN) entity 906 encompassing MME and S-GW functionality. The CN entity 906 may be coupled by a user plane interface to a P-GW 908 and by a control plane interface to an authentication, authorization, and accounting (AAA) server 912. The AAA server 912 may in turn be coupled to one or more other MMES 914 of the cellular network.

Thus, as shown, the CN entity 906 and the P-GW may provide the core network functionality for static/nomadic devices 910. In this case, the control and user plane may be integrated in the core network, i.e., the MME and S-GW functionalities are co-located. Note that while shown as one interface, the logical CN-base station interface could still be separately designed with control and user interfaces if desired. At least in some embodiments, an authentication server/HSS may be shared for both static/nomadic devices networks and other networks. Topologically, the CN entity 906 and P-GW 908 could be located centrally or moved to (or towards) the network edge.

Figure 10:
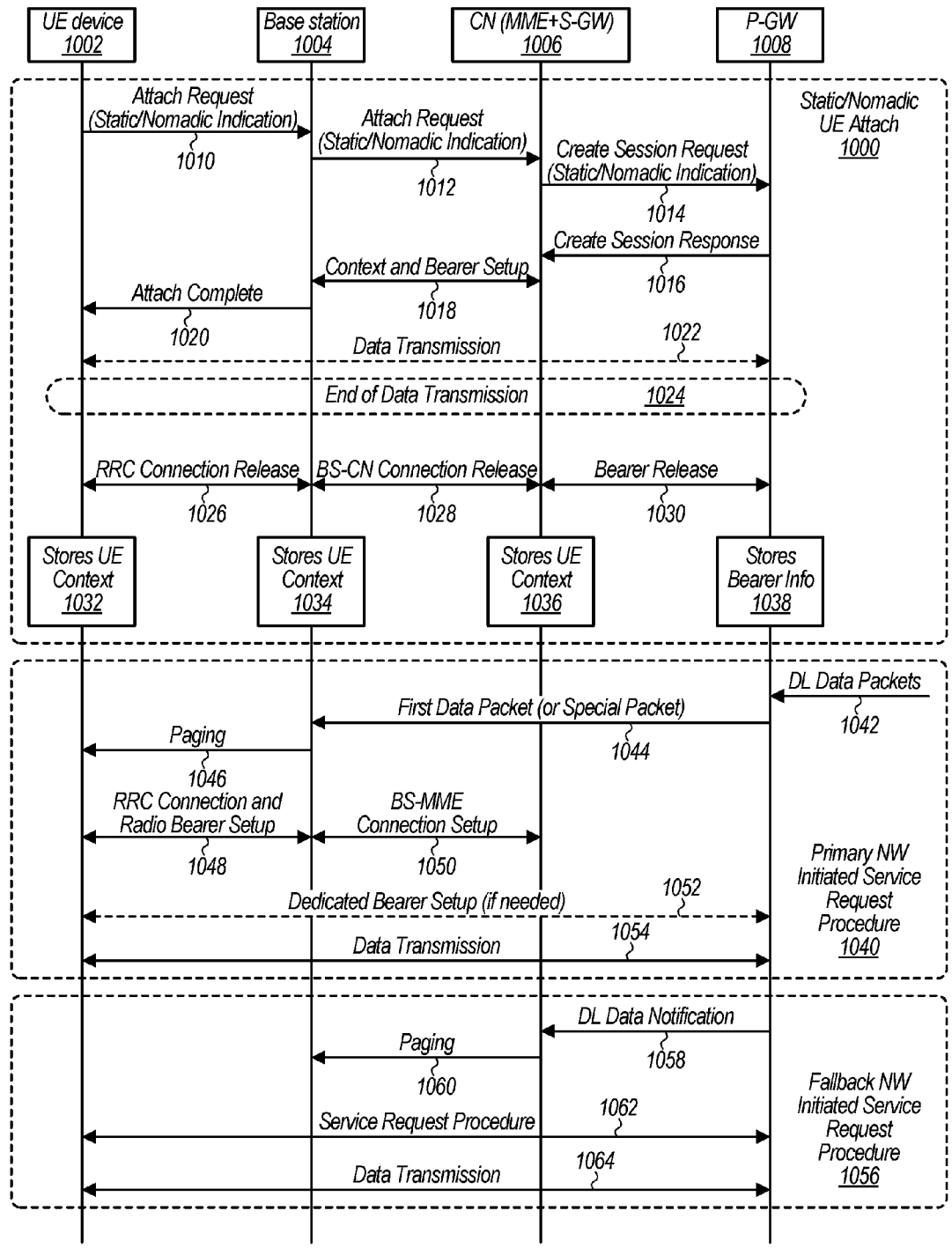
FIG. 10 is a signal flow diagram illustrating aspects of another possible network initiated service request procedure, according to some embodiments.

FIG. 10 illustrates a possible signal flow for providing a simplified network initiated downlink data transmission by storing UE context information from an attach procedure and using the stored UE context information for the network initiated downlink data transmission. The signal flow of FIG. 10 may be used in conjunction with the cellular network architecture of FIG. 9 (e.g., in which MME and S-GW functionality are co-located in a single CN entity)

According to the signal flow of FIG. 10, a UE 1002 may initially perform an attach procedure 1000. This may include providing at attach request (1010), which may include an indication that the UE device 1002 is a static/nomadic device, to a base station 1004. The base station 1004 may provide the attach request (1012) (which may retain the static/nomadic indication) to a core entity 1006. The CN entity 1006 may provide a create session request (1014), which may also include the static/nomadic indication, to a P-GW 1008. The P-GW 1008 may provide a create session response (1016) to the CN 1006. The base station 1004 and CN 1006 may perform context and bearer setup (1018). The base station 1004 may provide an indication to the UE device 1002 that the attach procedure is complete (1020). The UE device 1002 may perform any data transmissions (e.g., uplink and/or downlink exchanges) with the P-GW 1008 using the established context and data bearer (1022). At some point, the data transmission may be completed (1024). The UE 1002 and base station 1004 may at this point release the RRC connection between them (1026), the base station 1004 and CN 1006 may release the BS-CN connection (1028), and the CN 1006 and P-GW may release the bearer (1030). As the UE device 1002 transitions to idle mode, the UE 1002 may retain context information for the UE device 1002 (1032), the base station 1004 may retain context information for the UE device 1002 (1034), the CN 1006 may retain context information for the UE device 1002 (1036), and the P-GW 1008 may retain bearer information for the UE device 1002 (1038).

Subsequently, a network initiated service request procedure (1040) may be initiated, e.g., when downlink data packets (1042) for the UE 1002 are received by the P-GW 1008. The P-GW 1008 may provide the first data packet (or another packet, e.g., a specially defined trigger packet) to the base station 1004 (1044). The base station 1004 may page the UE device 1002 (1046). The UE device 1002 and the base station 1004 may perform RRC connection and radio bearer setup (1048), and the base station 1004 and the CN 1006 may perform BS-MME connection setup (1050). If needed (e.g., depending on the type of downlink data transaction, its QoS requirements, etc.), a dedicated bearer may be setup between the UE device 1002 and the P-GW 1008 (1052). Data transmission (e.g., including the downlink data packets that triggered the network initiated downlink data transaction and possibly any uplink data packets the UE device 1002 might have to transmit) may then proceed using the established bearer(s) (1054).

According to some embodiments, if the network intiated service request procedure (1040) is unsuccessful, an alternate (e.g., fallback) network initiated service request procedure (1056) may be attempted to achieve the downlink data transaction. In such a case, the P-GW 1008 may provide a downlink data notification to the CN 1006 (1058). The CN 1006 may provide a paging message to the BS 1004 (1060). The UE 1002 may then perform a full service request procedure with the network nodes 1004, 1006, 1008 (1062). Data transmission (e.g., including the downlink data packets that triggered the network initiated downlink data transaction and possibly any uplink data packets the UE device 1002 might have to transmit) may then proceed (1064).

In the following further exemplary embodiments are provided.

One set of embodiments may include an apparatus, comprising: a processing element configured to cause a cellular network entity of a cellular network to: receive an attach request from a wireless device, wherein the attach request indicates that the wireless device is a static or nomadic device; establish a data bearer for the wireless device in response to the attach request; communicate data with the wireless device using the data bearer; release the wireless device to an idle mode, wherein context information for the wireless device is stored after releasing the wireless device; and initiate a downlink data transmission to the wireless device using the stored context information.

According to some embodiments, the processing element is configured to provide cellular base station functionality in the cellular network.

According to some embodiments, the processing element is further configured to cause the cellular network entity to: receive a first data packet of the downlink data transmission from a packet data gateway of the cellular network by way of a serving gateway of the cellular network as a trigger to initiate the downlink data transmission to the wireless device, wherein the first data packet is received using bearer information stored for the wireless device; and provide a paging message to the wireless device indicating a network initiated downlink data transmission based on receiving the first data packet of the downlink data transmission.

According to some embodiments, the processing element is further configured to cause the cellular network entity to: perform radio resource control (RRC) connection and radio bearer setup with the wireless device after providing the paging message to the wireless device without performing NAS authentication/security procedures based on storing the context information for the wireless device.

According to some embodiments, the processing element is configured to provide co-located mobility management entity (MME) and serving gateway (S-GW) functionality for static and nomadic devices of the cellular network.

According to some embodiments, to initiate the downlink data transmission to the wireless device, the processing element is further configured to: provide a first data packet of the downlink data transmission received from a packet data gateway of the cellular network to a base station serving the wireless device using the stored context information.

According to some embodiments, the context information for the wireless device is stored based on the indication that the wireless device is a static or nomadic device.

According to some embodiments, the stored context information for the wireless device comprises one or more of: Uu context information for the wireless device; security information for the wireless device; data radio bearer information for the wireless device; S1-MME context information for the wireless device; or S1-U bearer information for the wireless device.

A further set of embodiments may include a cellular core network entity, comprising: a network interface; and a processing element communicatively coupled to the network interface; wherein the network interface and the processing element are configured to: receive an attach request from a wireless device, wherein the attach request indicates to store context information for the wireless device after the wireless device is released to an idle mode; perform data bearer and context setup for the wireless device in response to the attach request; communicate data with the wireless device using the data bearer; release the wireless device to the idle mode, wherein the context information for the wireless device is stored after releasing the wireless device to the idle mode; and initiate a downlink data transmission to the wireless device using the stored context information.

According to some embodiments, the attach request indicates to store context information for the wireless device after the wireless device is released to the idle mode implicitly by indicating that the wireless device is a static or nomadic device.

According to some embodiments, the network interface and the processing element are configured to provide both core network control plane functionality and core network user plane functionality for static and nomadic devices operating in a cellular network.

According to some embodiments, to initiate the downlink data transmission, the network interface and the processing element are further configured to: receive a packet triggering initiation of the downlink data transmission from a packet gateway of the cellular network using stored bearer information for the wireless device; and provide the packet triggering initiation of the downlink data transmission to a base station serving the wireless device.

According to some embodiments, the stored context information for the wireless device comprises one or more of: security information for the wireless device; S1-MME context information for the wireless device; or S1-U bearer information for the wireless device.

According to some embodiments, the network interface and the processing element are further configured to: fallback to a network initiated service request procedure comprising receiving a non access stratum (NAS) service request from the wireless device and performing NAS authentication/security procedures for the wireless device if the downlink data transmission to the wireless device using the stored context information is unsuccessful.

A still further set of embodiments may include a wireless device, comprising: a radio; and a processing element communicatively coupled to the radio; wherein the radio and the processing element are configured to: perform an attach procedure with a cellular network, wherein performing the attach procedure comprises providing an indication to store context information for the wireless device while the wireless device is in an idle mode, wherein performing the attach procedure further comprises establishing a default data bearer; store context information for the wireless device after completion of the attach procedure while the wireless device is in the idle mode; and respond to a network initiated service request using the stored context information.

According to some embodiments, the indication to store context information for the wireless device while the wireless device is in an idle mode comprises an indication that the wireless device is a static or nomadic device included in a attach request.

According to some embodiments, storing context information for the wireless device after completion of the attach procedure while the wireless device is in the idle mode is performed based on the wireless device being a static or nomadic device.

According to some embodiments, the indication to store context information for the wireless device while the wireless device is in an idle mode causes a cellular base station serving the wireless device to store context information for the wireless device while the wireless device is in the idle mode, wherein the indication further causes one or more additional cellular network entities to store context information for the wireless device while the wireless device is in the idle mode.

According to some embodiments, the context information for the wireless device stored by the wireless device comprises one or more of: Uu context information; security information; or data radio bearer information.

According to some embodiments, the radio and the processing element are configured to respond to the network initiated service request by performing radio resource control (RRC) connection and radio bearer setup in response to a paging message without performing NAS authentication/security procedures based on storing the context information for the wireless device.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processing element configured to cause a cellular network entity of a cellular network to:
provide co-located mobility management entity (MME) and serving gateway (S-GW) functionality for static and limited mobility devices of the cellular network, wherein the MME and S-GW functionality for the static and limited mobility devices of the cellular network are combined;
receive an attach request from a wireless device, wherein the attach request indicates that the wireless device is a static or limited mobility device, wherein the indication comprises an indicator value or cause code;
establish a data bearer for the wireless device in response to the attach request;
communicate data with the wireless device using the data bearer;
release the wireless device to an idle mode, wherein context information for the wireless device is stored after releasing the wireless device, wherein the context information for the wireless device is stored based on the indication that the wireless device is a static or limited mobility device; and
in response to received downlink data packets for the wireless device, initiate a downlink data transmission to the wireless device using the stored context information to facilitate more rapid downlink data transmission of the downlink data packets to the wireless device.

2. The apparatus of claim 1, wherein to initiate the downlink data transmission to the wireless device, the processing element is further configured to:
provide a first data packet of the downlink data transmission received from a packet data gateway of the cellular network to a base station serving the wireless device using the stored context information.

3. The apparatus of claim 1, wherein the stored context information for the wireless device comprises one or more of:
Uu context information for the wireless device;
security information for the wireless device;
data radio bearer information for the wireless device; or
S1-U bearer information for the wireless device.

4. A cellular core network entity, comprising:
a network interface; and
a processing element communicatively coupled to the network interface;
wherein the processing element is configured to cause the cellular core network entity to:
provide co-located mobility management entity (MME) and serving gateway (S-GW) functionality for static and limited mobility devices of the cellular network, wherein the MME and S-GW functionality for the static and limited mobility devices of the cellular network are combined;
receive an attach request from a wireless device, wherein the attach request indicates to store context information for the wireless device after the wireless device is released to an idle mode by indicating that the wireless device is a static or limited mobility device, wherein said indicating comprises an indicator value or cause code;
perform data bearer and context setup for the wireless device in response to the attach request;
communicate data with the wireless device using the data bearer;
release the wireless device to the idle mode, wherein the context information for the wireless device is stored after releasing the wireless device to the idle mode; and
initiate a downlink data transmission to the wireless device using the stored context information to facilitate more rapid downlink data transmission of the downlink data packets to the wireless device, wherein the downlink data transmission is initiated in response to receiving a packet triggering initiation of the downlink data transmission from a packet gateway of the cellular network using stored bearer information for the wireless device.

5. The cellular core network entity of claim 4, wherein to initiate the downlink data transmission, the processing element is further configured to cause the cellular core network entity to:
provide the packet triggering initiation of the downlink data transmission to a base station serving the wireless device.

6. The cellular core network entity of claim 4, wherein the stored context information for the wireless device comprises one or more of:
security information for the wireless device;
S1-MME context information for the wireless device; or
S1-U bearer information for the wireless device.

7. The cellular core network entity of claim 4, wherein the the processing element is further configured to cause the cellular core network entity to:
fallback to a network initiated service request procedure comprising receiving a non access stratum (NAS) service request from the wireless device and performing NAS authentication/security procedures for the wireless device when the downlink data transmission to the wireless device using the stored context information is unsuccessful.

8. The apparatus of claim 1, wherein the attach request indicates to store context information for the wireless device after the wireless device is released to an idle mode.

9. The apparatus of claim 1,
wherein the stored context information for the wireless device comprises S1-MME context information for the wireless device.

10. The cellular core network entity of claim 4, wherein the stored context information for the wireless device comprises Uu context information for the wireless device.

11. The apparatus of claim 1, wherein the processing element is further configured to cause the cellular core network entity to:

fallback to a network initiated service request procedure comprising receiving a non access stratum (NAS) service request from the wireless device and performing NAS authentication/security procedures for the wireless device when the downlink data transmission to the wireless device using the stored context information is unsuccessful.

12. A method, comprising:

by a cellular network entity of a cellular network:
- providing co-located mobility management entity (MME) and serving gateway (S-GW) functionality for static and limited mobility devices of the cellular network, wherein the MME and S-GW functionality for the static and limited mobility devices of the cellular network are combined;
- receiving an attach request from a wireless device, wherein the attach request indicates that the wireless device is a static or limited mobility device, wherein the indication comprises an indicator value or cause code;
- establishing a data bearer for the wireless device in response to the attach request;
- communicating data with the wireless device using the data bearer;
- releasing the wireless device to an idle mode, wherein context information for the wireless device is stored after releasing the wireless device, wherein the context information for the wireless device is stored based on the indication that the wireless device is a static or limited mobility device; and
- in response to received downlink data packets for the wireless device, initiating a downlink data transmission to the wireless device using the stored context information to facilitate more rapid downlink data transmission of the downlink data packets to the wireless device.

13. The method of claim 12, wherein said initiating the downlink data transmission to the wireless device comprises providing a first data packet of the downlink data transmission received from a packet data gateway of the cellular network to a base station serving the wireless device using the stored context information.

14. The method of claim 12, further comprising:
falling back to a network initiated service request procedure comprising receiving a non access stratum (NAS) service request from the wireless device and performing NAS authentication/security procedures for the wireless device when the downlink data transmission to the wireless device using the stored context information is unsuccessful.

15. The method of claim 12, wherein the attach request indicates to store context information for the wireless device after the wireless device is released to an idle mode.

16. The method of claim 12, wherein the stored context information for the wireless device comprises S1-MME context information for the wireless device.

17. The method of claim 12, wherein the stored context information for the wireless device comprises Uu context information for the wireless device.

18. The method of claim 12, wherein the stored context information for the wireless device comprises security information for the wireless device.

19. The method of claim 12, wherein the stored context information for the wireless device comprises data radio bearer information for the wireless device.

20. The method of claim 12, wherein the stored context information for the wireless device comprises S1-U bearer information for the wireless device.

* * * * *